(12) United States Patent
Hodges

(10) Patent No.: US 10,605,897 B2
(45) Date of Patent: Mar. 31, 2020

(54) VEHICLE LANE ALIGNMENT CORRECTION IMPROVEMENTS

(71) Applicant: VEONEER US, INC., Southfield, MI (US)

(72) Inventor: Brian Hodges, Nashua, NH (US)

(73) Assignee: Veoneer US, Inc., Southfield, MI (US)

( * ) Notice: Subject to any disclaimer, the term of this patent is extended or adjusted under 35 U.S.C. 154(b) by 157 days.

(21) Appl. No.: 15/913,726

(22) Filed: Mar. 6, 2018

(65) Prior Publication Data

US 2019/0277946 A1    Sep. 12, 2019

(51) Int. Cl.
| | | |
|---|---|---|
| *G01S 13/931* | (2020.01) | |
| *G01S 7/40* | (2006.01) | |
| *G05D 1/02* | (2020.01) | |
| *G08G 1/16* | (2006.01) | |

(52) U.S. Cl.
CPC .......... *G01S 7/4021* (2013.01); *G01S 13/931* (2013.01); *G05D 1/0212* (2013.01); *G05D 1/0257* (2013.01); *G08G 1/166* (2013.01); *G08G 1/167* (2013.01); *G01S 2013/9315* (2020.01); *G05D 2201/0213* (2013.01)

(58) Field of Classification Search
CPC ................. G01S 7/4021; G01S 13/931; G01S 2013/9332; G01S 7/415; G05D 13/931; G05D 1/0212; G05D 1/0257; G05D 2201/0213; G08G 1/166; G08G 1/0962; G06K 9/00798; H04L 43/0811; B60K 31/0008

See application file for complete search history.

(56) References Cited

U.S. PATENT DOCUMENTS

| | | | |
|---|---|---|---|
| 5,530,447 A | * | 6/1996 | Henderson ............ G01S 13/931 340/904 |
| 6,025,797 A | | 2/2000 | Kawai et al. |

(Continued)

OTHER PUBLICATIONS

Tan et al., A Radar Guided Vision System for Vehicle Validation and Vehicle Motion Characterization, 2007, IEEE, p. 1053-1066 (Year: 2007).*

(Continued)

*Primary Examiner* — McDieunel Marc
(74) *Attorney, Agent, or Firm* — Matthew D. Thayne; Thayne and Davis LLC

(57) ABSTRACT

Systems and methods for improving vehicle RADAR or other sensor performance by application of error statistics. In some implementations, statistical correction of vehicle tracking errors are achieved by generating a first data set representative of a historical map of a host vehicle trajectory, a second data set representative of one or more adjacent lanes to a current lane of the host vehicle, and a third data set comprising estimated error correction values of an estimated bearing angle while the moving target vehicle is beyond a threshold distance by comparing the estimated bearing angle of the moving target vehicle relative to the host vehicle with an observed bearing angle of the moving target vehicle relative to the host vehicle. A set of estimated lane assignments may be generated after the moving target vehicle has passed the threshold distance from the host vehicle, after which a lane assignment may be confirmed.

20 Claims, 4 Drawing Sheets

(56) References Cited

U.S. PATENT DOCUMENTS

| | | | | |
|---|---|---|---|---|
| 6,026,347 | A * | 2/2000 | Schuster | B62D 1/28 |
| | | | | 180/167 |
| 6,338,022 | B1 * | 1/2002 | Shinmura | B62D 6/003 |
| | | | | 701/301 |
| 6,571,176 | B1 * | 5/2003 | Shinmura | B60T 7/22 |
| | | | | 180/421 |
| 7,034,742 | B2 * | 4/2006 | Cong | B60K 31/0008 |
| | | | | 342/107 |
| 8,983,725 | B2 | 3/2015 | Breu | |
| 9,229,098 | B2 | 1/2016 | Gross et al. | |
| 9,838,290 | B2 * | 12/2017 | Gareau | H04L 43/0811 |
| 2002/0049539 | A1 | 4/2002 | Russell et al. | |
| 2003/0218564 | A1 | 11/2003 | Tamatsu et al. | |
| 2005/0179580 | A1 | 8/2005 | Cong et al. | |
| 2005/0251323 | A1 | 11/2005 | Henrichs-Bartscher | |
| 2005/0256630 | A1 | 11/2005 | Nishira | |
| 2009/0067675 | A1 * | 3/2009 | Tan | G06K 9/00798 |
| | | | | 382/104 |
| 2010/0253540 | A1 | 10/2010 | Seder et al. | |
| 2012/0101711 | A1 * | 4/2012 | Furmston | G01S 7/415 |
| | | | | 701/300 |
| 2012/0330528 | A1 * | 12/2012 | Schwindt | G01S 13/52 |
| | | | | 701/96 |
| 2014/0244151 | A1 * | 8/2014 | Matsubara | G08G 1/165 |
| | | | | 701/301 |
| 2014/0358322 | A1 | 12/2014 | Ibrahim | |
| 2016/0035222 | A1 * | 2/2016 | Mikuni | G08G 1/0962 |
| | | | | 701/117 |
| 2018/0365859 | A1 * | 12/2018 | Oba | H04N 5/232 |
| 2019/0258251 | A1 * | 8/2019 | Ditty | G05D 1/0088 |

OTHER PUBLICATIONS

Zhenhai et al., Study Lane Curvature Estimation Algorithm Based on Radar, 2017, IEEE, pg. (Year: 2017).*

Tsang et al., Advance Path Measurement for Automotive Radar Applications, 2006, IEEE, p. 273-281 (Year: 2006).*

Schuster et al., Tracking of vehicles on nearside lanes using multiple radar sensors, 2014, IEEE, p. 1-6 (Year: 2014).*

International Search Report for PCT/US2019/020413, dated May 24, 2019, 2 pgs.

Written Opinion for PCT/US2019/020413, dated May 24, 2019, 5 pgs.

* cited by examiner

VEHICLE LANE ALIGNMENT CORRECTION IMPROVEMENTS

SUMMARY

Modern automobiles often employ various vehicle remote detection safety systems, such as vehicle lane change assist (LCA) systems, rear cross traffic alert (RCTA) systems, and the like. Such systems employ remote, environmental sensors, such as RADAR, LIDAR, cameras, etc., that are used to assist a vehicle driver in avoiding collisions. In doing so, some such systems maintain data representative of a historical trajectory or map of the host vehicle.

However, it has been discovered that errors may be introduced with regard to the perceived alignment and/or position of various targets, such as moving target vehicles. Such errors may be caused by, for example, vehicle fascia, environmental conditions, aging, and other distorting factors.

The present inventors have therefore determined that it would be desirable to provide systems and methods that overcome one or more of the foregoing limitations and/or other limitations of the prior art. Thus, in some embodiments, the inventive concepts disclosed herein may be used to apply corrections to detected parameters, which corrections may be adaptively computed using stationary scatterers/targets and/or moving targets, such as moving target vehicles. In some embodiments, these corrections may be expressed as range and/or angle dependent bias and/or variance estimates, and may be applied so as to continuously improve measurements over time to enhance system performance.

In a more particular example of a method for correcting vehicle RADAR errors from within a moving host vehicle and/or lane assignment of a moving target vehicle from within a moving host vehicle, the method may comprise generating a first data set representative of a historical map of a host vehicle trajectory and generating a second data set representative of one or more adjacent lanes to a current lane of the host vehicle. A moving target vehicle may be identified, and a lane assignment of the moving target vehicle may be estimated while the moving target vehicle is beyond a threshold distance from the host vehicle. This may be accomplished, for example, by comparing an estimated bearing angle of the moving target vehicle relative to the host vehicle with an observed bearing angle of the moving target vehicle relative to the host vehicle. Thus, in some embodiments, a third data set may be generated comprising estimated RADAR correction values of an estimated bearing angle while the moving target vehicle is beyond a threshold distance from the host vehicle by comparing the estimated bearing angle of the moving target vehicle relative to the host vehicle with an observed bearing angle of the moving target vehicle relative to the host vehicle.

In some embodiments, a set of estimated lane assignments including at least the current lane of the host vehicle and at least one adjacent lane to the current lane of the host vehicle may be generated after the moving target vehicle has passed the threshold distance from the host vehicle.

A lane assignment of the moving target vehicle may then be determined and/or confirmed while the moving target vehicle is within the threshold distance from the host vehicle. A third data set may be generated comprising estimated errors of the estimated bearing angle. At least a subset of the third data set may then be applied as an input to a filter model associated with correction of RADAR errors of subsequent targets and/or estimating a lane assignment of subsequent moving target vehicles.

In some embodiments, the threshold distance may be a distance of no more than about 20 meters.

Some embodiments may comprise both an upper threshold distance and a lower threshold distance. In some embodiments, the lower threshold distance may be about 10 meters.

In some embodiments, the second data set may comprise data representative of a first adjacent lane to the current lane of the host vehicle and data representative of an adjacent lane to the first adjacent lane. In some such embodiments, a far adjacent lane (adjacent to the adjacent lane) may also be represented in the second data set.

In some embodiments, the step of generating a set of estimated lane assignments of the moving target vehicle while the moving target vehicle is beyond a threshold distance from the host vehicle may comprise generating estimated lane assignments for the current lane of the host vehicle, a first adjacent lane to the current lane of the host vehicle, and an adjacent lane to the first adjacent lane after the moving target vehicle has passed the threshold distance from the host vehicle.

Some embodiments may further comprise, before the step of applying at least a subset of the third data set as an input to a filter model associated with correcting RADAR errors associated with subsequent moving target vehicles, determining whether the set of estimated lane assignments for a most-assigned lane exceeds a threshold percentage of total possible lane assignments. Some such embodiments may further comprise, upon confirming that the set of lane assignments has exceeded the threshold percentage, applying at least a subset of the third data set as an input to a filter model associated with correcting RADAR errors associated with subsequent moving target vehicles. In some embodiments, the third data set may be excluded from application to the filter model associated with correction of RADAR errors associated with subsequent moving target vehicles if the set of lane assignments has not exceeded the threshold percentage. In some embodiments, the third data set may be applied using only correction values associated with a confirmed lane assignment and the other correction error data may be discarded. In some embodiments, the threshold percentage of lane assignments may be at least about 60% of total lane assignments.

In some embodiments, the step of generating a third data set comprising estimated RADAR correction values while the moving target vehicle is beyond a threshold distance from the host vehicle further may comprise compiling error statistics associated with one or more stationary targets.

In an example of a method for statistical correction of lane alignment of a moving target vehicle from within a moving host vehicle, the method may comprise generating a first data set representative of a historical map of a host vehicle trajectory and calculating a position of at least one adjacent lane to a current lane of the host vehicle using a predetermined lane width, such as a known and/or standard lane width or one measured by the system. A moving target vehicle may then be identified and error statistics associated with a bearing angle of the moving target vehicle from within the current lane of the host vehicle (i.e., under the assumption or hypothesis that the moving target vehicle is within the current lane of the host vehicle) may be compiled. Error statistics associated with a bearing angle of the moving target vehicle from within at least one adjacent lane to the current lane of the host vehicle may also be compiled and the moving target vehicle may be assigned to one of the lanes.

In preferred embodiments and implementations, one or both of these error correction compilation steps may be performed while the moving target vehicle is beyond a threshold distance and/or range from the host vehicle. Error statistics associated with the assigned lane may then be used as an input to a filter model associated with estimating a lane assignment and/or applying statistical correction of the alignment/position of subsequent moving target vehicles.

In some embodiments, the moving target vehicle may be behind the host vehicle. However, it is also contemplated that these error correction methods/systems may be applied to forward-looking targets as well.

Some embodiments may further comprise compiling error statistics associated with at least one stationary target. In some embodiments, the step of compiling error statistics associated with at least one stationary target may comprise comparing a bearing angle of a stationary target with an estimated bearing angle of the stationary target derived from Doppler RADAR data.

Some embodiments may further comprise, prior to using error statistics associated with the assigned lane as an input to a filter model associated with estimating a lane assignment of subsequent moving target vehicles, confirming that a RADAR signal is being received from a stationary target. In some such embodiments, the step of confirming that a RADAR signal is being received from a stationary target may comprise determining whether the bearing angle of the stationary target is within a threshold angle of the estimated bearing angle of the stationary target; and upon confirming that the bearing angle of the stationary target is within the threshold angle of the estimated bearing angle of the stationary target, considering the RADAR signal as having been received from a stationary target.

In an example of a system for statistical correction of lane alignment of a moving target vehicle from within a moving host vehicle, the system may comprise one or more environmental sensors, such as RADAR sensors, configured to generate vehicle environmental data associated with a moving host vehicle. The system may further comprise a vehicle trajectory module configured to process the vehicle environmental data and to generate vehicle trajectory data of the moving host vehicle; and a lane assignment module configured to generate a plurality of lanes using the vehicle trajectory data and a predetermined lane width, the plurality of lanes including a current lane of the moving host vehicle and at least one adjacent lane to the moving host vehicle. The system may further comprise an error estimation module configured to estimate angle bearing errors associated with bearing angles of targets, such as moving target vehicles and/or stationary targets, and may further comprise a filter module, such as a Kalman filter, that may be configured to receive error data from the error estimation module and use the error data to improve future estimates of angle bearing errors associated with bearing angles of future targets.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to applying corrections to errors, such as RADAR bearing estimation errors, that may be introduced by a variety of factors such as vehicle fascia, environmental conditions, aging, and the like. In some embodiments, error statistics may be derived from both stationary and moving targets, and may be decoupled from observed/measured, raw data to continuously improve measurement accuracy over time.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
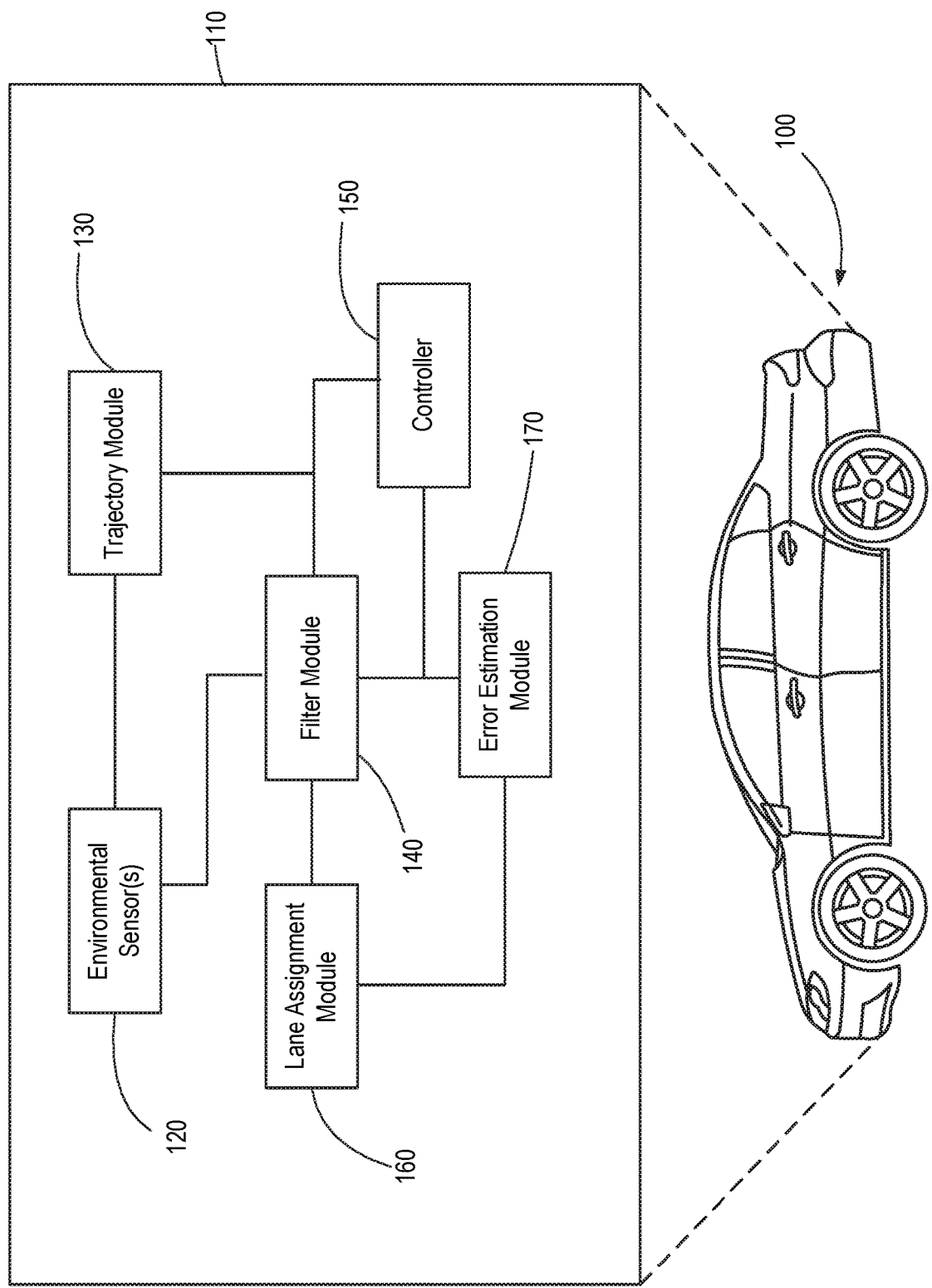
FIG. 1 is a schematic diagram of a vehicle comprising a vehicle remote detection safety system according to some embodiments.

FIG. 1 is a schematic diagram of a vehicle 100 comprising a vehicle remote detection safety system 110 according to some embodiments. System 110 may comprise, for example, a vehicle lane change assist (LCA) system, a rear cross traffic alert (RCTA) system, or any other system comprising remote, environmental sensors, such as RADAR, LIDAR, cameras, etc., that are used to assist a vehicle driver in avoiding collisions. System 110 therefore comprises one or more sensors 120. Again, sensor(s) 120 may comprise, for example, RADAR sensors, LIDAR sensors, optical cameras, and/or the like. System 110 further comprises a path/trajectory module 130, which may be used to generate a trajectory and/or path of the host vehicle. Data for obtaining this path may be generated from sensor(s) 120.

A filter module 140 may also be provided, which may be used, in combination with controller 150, to process data from sensor(s) 120. As used herein, the term controller refers to a hardware device that includes a processor and preferably also includes a memory element. The memory may be configured to store one or more of the modules referred to herein and the controller 150 and/or processor may be configured to execute the modules to perform one or more processes described herein. In some embodiments, filter module 140 may comprise a Kalman filter. Filter module 140 may be configured to receive error data from an error estimation module 170 (see below) and use the error data, along with new data from environmental sensor(s) 120 and/or trajectory module 130, to improve future estimates of bearing angles of future targets.

Other modules may also be provided, each of which may be used, in some such embodiments in combination with controller 150, to process data as described herein. For example, as shown in FIG. 1, a lane assignment module 160 may be provided, which module may be used to preliminarily and/or permanently predict and/or assign moving targets to a particular lane from amongst, for example, a current lane of the host vehicle and one or more adjacent lanes to the current lane of the host vehicle.

For example, in some embodiments, lane assignment module 160 may be configured to generate a plurality of lanes using vehicle trajectory data, which may be received from trajectory module 130, and a predetermined lane width. The predetermined lane width may, in some embodiments, be measured by a sensor, such as sensor 120. Alternatively, a known lane width may be programmed into lane assignment module 160. In some embodiments, lane assignment module 160 may be configured to map and/or compute lane boundaries associated with multiple adjacent lanes to the host vehicle. In some such embodiments, lane assignment module 160 may be configured to map and/or compute lane boundaries associated with two adjacent lanes and one or more far lanes adjacent to those adjacent lanes (i.e., at least two lanes from the host vehicle lane).

In some embodiments, lane assignment module 160 may be configured to, upon generation of a map and/or lane boundaries associated with one or more of these lanes, assign a target vehicle to one of the lanes. In some such embodiments, as discussed in greater detail below in connection with preferred methods, lane assignment module 160 may be configured to preliminarily assign or predict this target vehicle lane, which may be done, for example, by using data from sensor(s) 120 and/or vehicle trajectory data from trajectory module 130 and/or error statistics relating to such data, which may be generated by error estimation module 170, as discussed below, and may be fed into filter module 140. In some such embodiments, this preliminary assignment may require confirmation, such as by exceeding one or more thresholds (again, as discussed in greater detail below), before being confirmed, which may accompany use of associated error statistics in future processing.

Error estimation module 170 may be configured to estimate various errors associated with parameters involved in detecting moving targets from the host vehicle, such as, for example, errors associated with bearing angles of targets. Such error estimates may be used to correct lane alignments of targets, such as correcting an estimated lane assignment or improving the accuracy of a predicting lane assignment.

In some embodiments, these corrections may be expressed as range and/or angle-dependent bias and/or variance estimates.

In some embodiments, both stationary targets and moving targets may be used. In some such embodiments, error corrections may be made to both the stationary and the moving targets. In some embodiments, for stationary target error corrections, system 110 may compare target bearing estimates with target angle estimates, which estimates may be derived from relative velocity.

For moving target error corrections, some embodiments may be configured to employ various "shortcuts" or observations related to sensor performance and/or driving behavior. For example, the present inventors have recognized that, at relatively close ranges (up to about 20 m), the desired angle accuracy is less significant and lane assignment is typically more dependent on the accuracy of the range than the angle. In addition, tracking performance is typically quite reliable in lane assignment at short ranges (about 10 m-20 m or up to about 20 m) irrespective of angle errors. Moreover, in most high-speed passing scenarios (greater than about 5 m/s), target vehicles rarely change lanes (typically less than 10% of the time) and, when passing does occur, it usually occurs at the closer range of less than about 20 m. These recognitions/statistics may allow for computation of lane alignment and/or assignment corrections for most vehicle models, sensor, and bumper variations.

Figure 2:
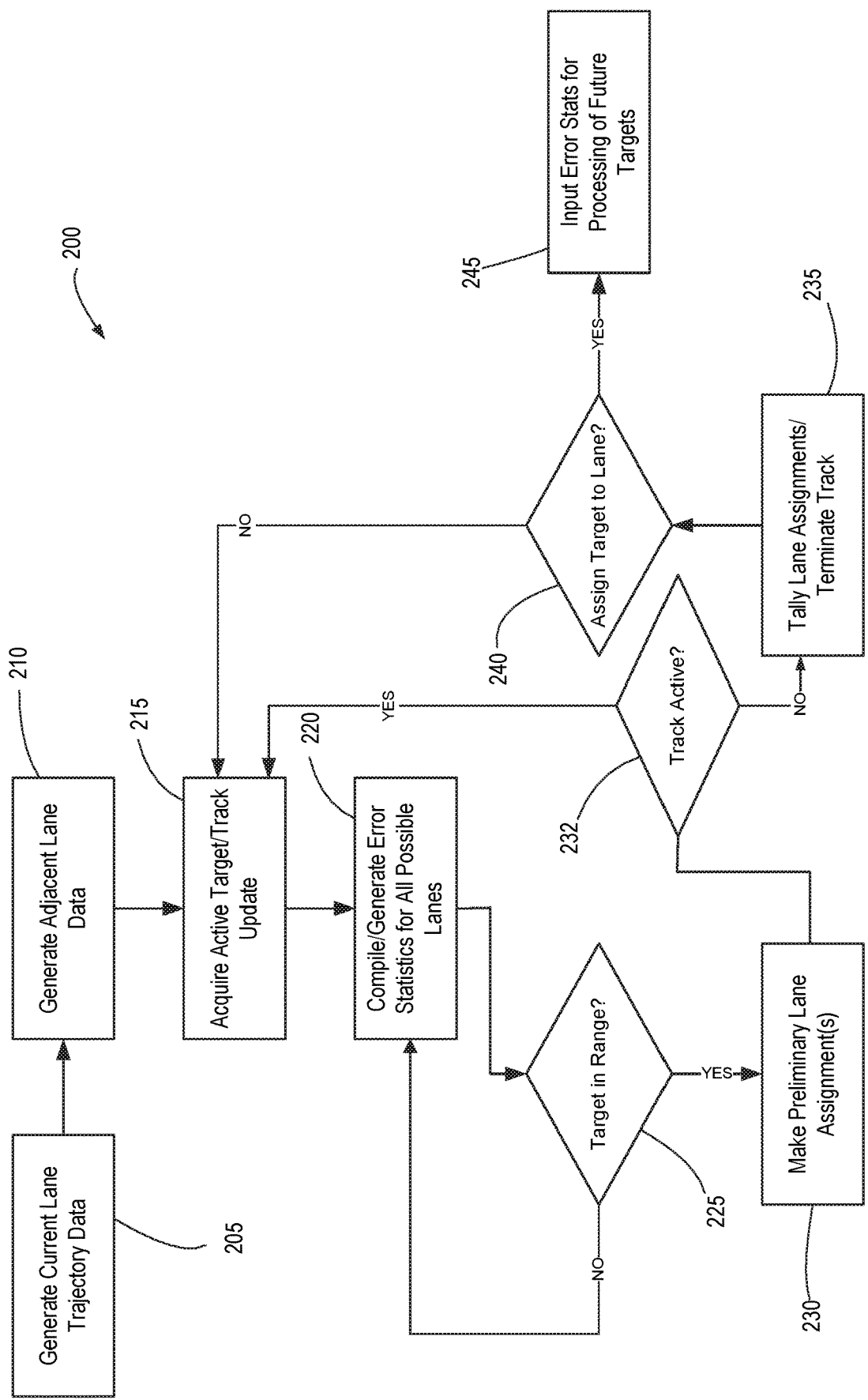
FIG. 2 is a flow chart illustrating a process for correcting vehicle RADAR errors from within a moving host vehicle according to some implementations.

A flow chart for an exemplary process 200 for lane assignment and/or correction of vehicle RADAR errors of a moving target vehicle from within a moving host vehicle is depicted in FIG. 2. As shown in this figure, the process may begin at 205 by generating current lane trajectory data, which data may be representative of a historical map of a host vehicle trajectory. It should be understood that the actual generation of a map need not take place, however. This data may be obtained, at least in part, from one or more RADAR sensors or other environmental sensors, such as sensor(s) 120 in FIG. 1.

Process 200 may then proceed to step 210, at which point data for one or more adjacent lanes to the current host lane may be generated. As previously mentioned, in some implementations, data associated with one or more adjacent lanes and one or more far lanes (adjacent to the adjacent lane) may also be generated. In some implementations, step 210 may comprise computing a center and/or boundary point for one or more of the adjacent lanes. This may be done, for example, by using standard and/or predetermined lane widths applied in positions orthogonal to the current host vehicle path and/or previous host vehicle path. In some implementations, this step may comprise generating adjacent lane trajectories as a function of range.

One or more targets may then be acquired and/or identified, such as moving target vehicles, and/or the track may be updated for existing targets being tracked, at 215. As described elsewhere in this disclosure, both moving and stationary targets may be used to improve statistical analyses of the moving target vehicle. Error statistics may be generated at 220 using such stationary and/or moving targets.

In some implementations, error statistics may be obtained, generated, and/or used for all possible lanes of a moving target vehicle. For example, in some such implementations, three separate lane hypotheses may be maintained, at least for a certain time period (such as up to a threshold distance from the host vehicle or until the target vehicle passes the host vehicle, for example), which three lane hypotheses may comprise the current lane of the host vehicle, an adjacent lane to the current lane, and a far adjacent lane (adjacent to the immediately adjacent lane).

For example, stationary target error corrections may be derived using the relationship between scatterer Doppler and angle. For example, in some implementations, an initial determination may be made as to whether a particular target is indeed stationary. For example, in some implementations, a determination may be made as to whether the Doppler-derived angle referenced above is within a threshold angle of a direct bearing measurement and/or estimate. In some implementations, the threshold may be between about three degrees and about eight degrees. In some such implementations, this determination may be made if these two angles are within about five degrees of each other. In alternative implementations, a stationary detection cancellation scheme may be employed, such as a scheme that uses an estimate of a phase correction that will cancel any stationary target.

Upon confirmation of a target being stationary, the relationship between the target Doppler and the radial velocity ($V_r$) of the host velocity ($V_H$) may be used to generate stationary target error corrections. For example, an estimate of the angle may be derived by the following equation:

$$\theta_{dopp} = \text{acos}\left(\frac{V_r(\text{Doppler})}{V_H}\right)$$

In some embodiments and implementations, moving target error corrections may also, or alternatively, be used. In such embodiments and implementations, the moving target error corrections may use the previous path of the host vehicle to estimate the lane boundaries. Assuming the adjacent lanes are parallel to this path, lane boundaries may be calculated by computing the vector that is orthogonal to each step of the path history, and shifting with multiples of the standard lane width (or a measured lane width) as offsets. The offset angle relative to the center of each lane may then be computed as a function of range from the host. Moving target error corrections/statistics may then be generated by comparing this estimate with the observed bearing angle.

In some embodiments and implementations, an additional step may be employed during the compilation of error statistics. Because the target lane may initially be undetermined, error statistics may be compiled, for each of the possible lanes for a given RADAR or other sensor. For example, such error statistics may be compiled for the current host lane, an adjacent lane to the current host lane, and a far lane (adjacent to the adjacent lane). As the moving target approaches, the correct lane may therefore be estimated and corresponding error statistics updated accordingly.

In some embodiments and implementations, specific angular regions or bins may be used in the generation of error statistics. In some such embodiments and implementations, the equations to update a specific angular region may use the following equations. The updating function may also be range-weighted and may rely on the typical definitions of mean and variance (for the ith bin). The equations may be as follows:

$$mean_i(t) = \frac{mean_i(t-1) * wSum(t-1) + \text{range} * \Delta}{wSum(t-1) + \text{range}}$$

-continued $$variance_i(t) = \frac{[variance_i(t-1) + mean_i(t-1) * mean_i(t-1)] * wSum(t-1) + \text{range} * \Delta^2}{wSum(t-1) + \text{range}}$$

$$wsum(t) = wsum(t-1) + \text{range}$$

$$binCount(t) = binCount(t-1) + 1$$

Although it is contemplated that some embodiments and implementations may continue this iterative process indefinitely, preferred embodiments may provide a means for allowing the error corrections to perpetually vary over time rather than converge to an all-time mean and variance. This may be preferable, for example, because the present inventors have discovered that certain sensors, such as RADAR sensors, may benefit from corrections that vary as, for example, the environment in which the sensor operates varies. To provide for such benefits, the increment of wsum may be limited after a count is greater than a particular threshold or "saturation count." This variable may be related to a number of passing events or a number of hits, such as the number of hits in a particular angle bin, for example. Thus, in some embodiments and implementations, this threshold may be about 500 hits per bin or may be between about 5 and about 10 passing events. This threshold may, in some embodiments, be adjustable.

In still other implementations, the correction may reset due to other triggers, such as upon detecting a collision, loss of signal, vehicle shutdown, or predetermined time limits. Some embodiments and implementations may also allow for manual resetting of the error corrections, which may be useful, for example, in the event of a new sensor, change in vehicle fascia/structure, or new typical environment.

Some preferred embodiments and implementations may also be configured to de-couple the observed angle statistics from their corrections. In other words, corrections may be computed from un-corrected or raw data, which may prevent stability problems. Over time, these errors may therefore be accumulated as a function of angle and/or range.

In some implementations, a preliminary assignment or estimation of the lane of the moving target vehicle may also be performed at step 220. For example, a lane assignment of the moving target vehicle may be accomplished by use of error statistics for each of the possible lane assignments as a function of angle. For example, an estimated bearing angle of the moving target vehicle relative to the host vehicle may be compared with an observed bearing angle of the moving target vehicle relative to the host vehicle for each possible lane. As previously mentioned, the estimated bearing angle may be derived using both moving and stationary targets from the sensor(s). This initial lane assignment may be made, in some implementations, while the moving target vehicle is beyond a threshold distance from the host vehicle Some implementations of process 200, or other inventive processes disclosed herein, may also employ use of other thresholds, such as distance thresholds. For example, step 225 may seek confirmation that a moving target vehicle is within a threshold distance/range. In some such implementations, the threshold distance may be an upper threshold distance of about 20 meters. In some such implementations, the upper threshold distance may be exactly 20 meters. In some implementations, the threshold distance may comprise a range of distances or, in other words, both an upper threshold and a lower threshold distance. In some such implementations, the lower threshold may comprise a distance of about 10 meters. In some such implementations, the lower threshold distance may be exactly 10 meters. In alternative implementations, the lower and upper thresholds may be about 5 meters and about 30 meters, respectively. Either of these alternative thresholds may be combined with the previous thresholds. For example, some embodiments and implementations may be configured to apply an upper threshold distance of 30 meters and a lower distance threshold of 10 meters, and so on.

If the target vehicle is not in range, process 200 may return to one of the previous steps, such as step 220. If the target vehicle is within range, process 200 may proceed to step 230 in which the target vehicle may be preliminarily assigned to a particular lane, such as one or more of the lanes previously mentioned. In some implementations, step 230 may comprise compiling a plurality of lane assignments within the threshold range. For example, the system may continuously register a plurality of looks within the threshold range, which is preferably a range in which each look can relatively accurately, if not definitively, determine the precise lane of the target.

A determination may then be made at 232 as to whether the track is still active. If so, method 200 may revert to step 215 at which time the track may be updated. In not, the various lane assignments may then be tallied at step 235 and/or the track may be terminated. In other words, because the target vehicle may be changing lanes within the threshold, a plurality of lane assignments may be required and/or a threshold percentage of such assignments must match before confirming a lane assignment, as discussed below.

Following tallying of the lane assignments, which, in some implementations, may take place after the track is no longer active, a determination may then be made at step 240 as to whether to confirm/assign the target to a particular lane, which, as discussed below, may determine whether the error statistics generated at step 220 are used in future target tracking or not. In some implementations, a threshold number of "looks" or lane assignments may be required before assigning the target to a lane at step 240. In some implementations, step 240 may comprise determining whether the number of preliminary lane assignments for the moving target exceeds a threshold percentage of total possible lane assignments. In some implementations, this threshold percentage may be at least about 60%. In some such implementations, the threshold percentage may be at least about 75%. In some implementations, the determination at step 240 may not be made until after the target vehicle has passed the lower distance threshold mentioned above. In some such implementations, the determination at step 240 may not be made until after the target vehicle has passed the host vehicle or the target track has otherwise terminated.

If a determination is made that the error statistics should not be applied to future processing, then process 200 may return to a previous step, such as step 215. If, on the other hand, a determination is made that the target has been confirmed/assigned to a particular lane, process 200 may proceed to step 245, at which point the compiled error statistics may be used as inputs in processing, such as filter processing, of future target tracking engagements. In some implementations, process 200 and/or a system configured to implement this process may be configured to only apply the error statistics generated prior to the threshold distance for the assigned/confirmed lane.

In some implementations, step 240 may comprise applying the statistical corrections of the assigned lane by adding the error mean and/or error variance to measurements prior to using them in an update, such as a Kalman update. In some implementations, the corrections may be computed and/or applied to each of a plurality of angle bins from a particular sensor, such as a RADAR sensor. Thus, in some implementations, the observed measurement may first be adjusted by the mean error, such as by subtracting the mean error from the observed measurement. Similarly, the error variance may be substituted as the angle measurement noise used in the update. In this manner, the uncertainty in the correction may be used to determine the weight the measurement will have in the update. Thus, relatively high uncertainty would have little impact on the updated estimates and lower uncertainty would be more heavily weighted to adjust the vehicle track to one more closely in line with the measurements. Thus, the angle and/or range corrections may accumulate and converge as they are applied to future tracking events in a decoupled manner.

Figure 3:
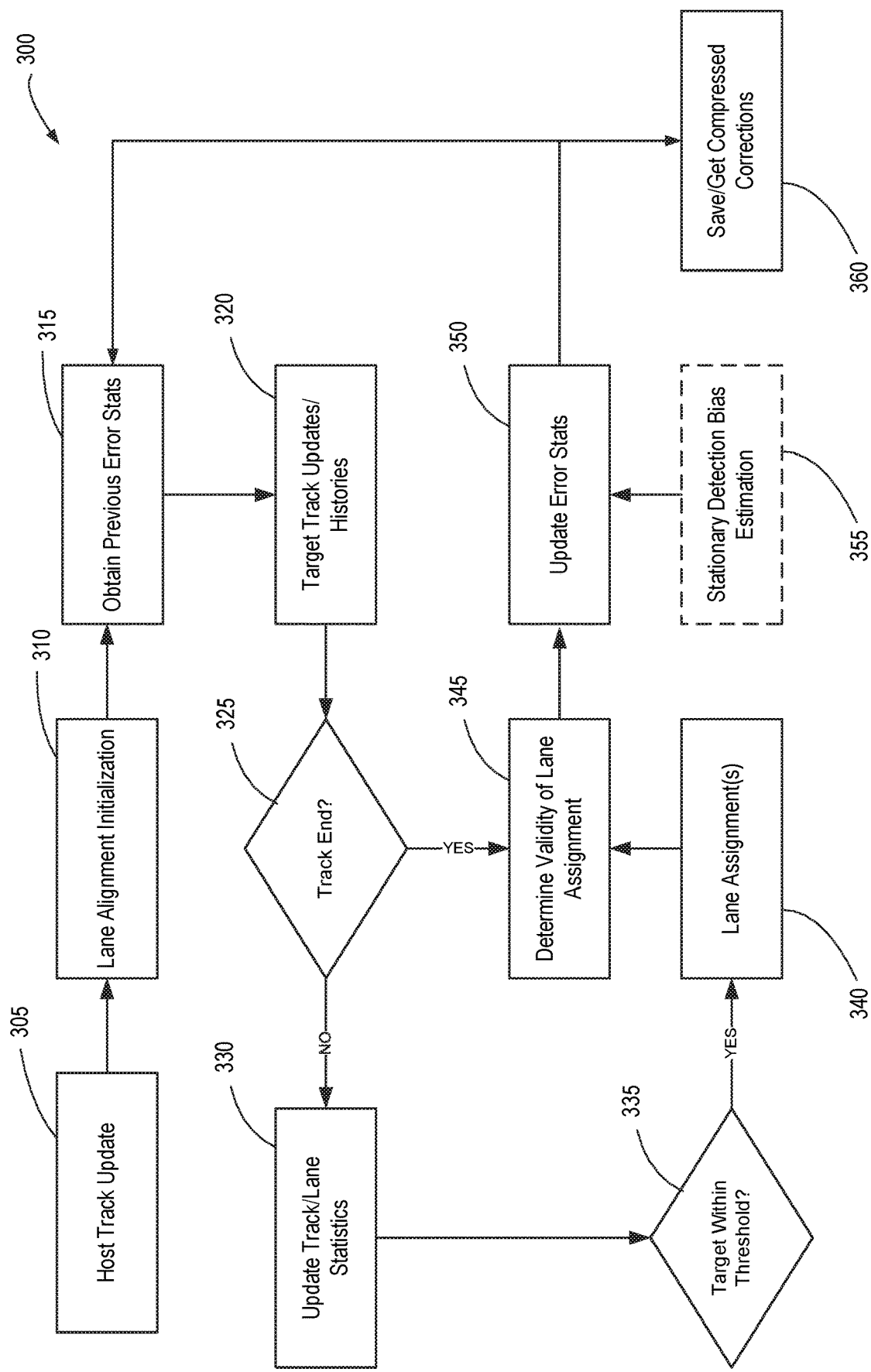
FIG. 3 is another flow chart illustrating another process for correcting vehicle RADAR errors from within a moving host vehicle according to other implementations.

FIG. 3 is another flow chart illustrating another exemplary process 300 for correcting vehicle RADAR errors from within a moving host vehicle according to other implementations, and which may be implemented by other systems. Process 300 may begin at step 305 by updating a track of a host vehicle in a mapping and/or tracking system, for example. For example, step 305 may comprise generating data sets representative of a current host vehicle path and/or one or more adjacent vehicle paths.

Process 300 may then proceed to step 310 at which point a lane alignment of the host vehicle within the host vehicle path may be initiated. In some implementations, step 310 may comprise use of, for example, host vehicle accelerometers, yaw rate sensors, and/or GPS to determine the previous host path relative to the current host vehicle position and orientation. In some such implementations, this may be done for a predetermined length of time and/or distance, such as for the past five seconds.

In some implementations, a known lane separation and/or previous host path information may be used to create a lookup table, such as angles as a function of range, that may be used to store angles to one or more possible lanes for a target vehicle. For example, angle data or other similar data may be generated for the current host vehicle lane, an adjacent lane, and a far adjacent lane (two lanes from the current host vehicle lane). This data may be used to compare measured angles at measured ranges to a computed lane center using the previous host path information. As explained below, this angle difference may also be used to compute error statistics for each possible lane, such as angle bias and/or variance errors.

In some implementations, process 300 may then proceed to step 315 at which point previous error statistics associated with previous targets may be obtained. In some implementations, step 315 may comprise use of an error correction table, which may comprise an error correction table with angle bias and/or variance values as a function of measured bearing angles.

These values may be stored from previous target trackings and, as discussed below, may be updated with each additional target tracked, or with at least a subset of each additional target tracked, so that the system continuously learns and improves over time. These angle or other error correction statistics may, for example, be used to correct for bearing angle distortions due to facia and other distorting effects on bearing estimations.

Thus, for example, process 300 may provide updates to a target track and/or history, such as a moving target vehicle, at 320. In some implementations, the target may be positioned behind the host vehicle. However, it is contemplated that, in alternative embodiments and implementations, the target may be positioned ahead of the host vehicle. In such embodiments and implementations, data associated with the forward-looking target may be stored and then correlated with the previous path track once the host vehicle has passed the initial tracking position of the forward-looking target to place the forward-looking target within the track once the host vehicle has reached the tracking point of the forward-looking target.

In some implementations, these error correction statistics, such the bias error and/or variance values, may be used in a tracking algorithm, such as a Kalman Filter. Such a tracking algorithm may be configured to accumulate measurements for a tracked object over time and produce an estimated position and/or velocity state for the target object, such as a target vehicle.

A determination may then be made as to whether the track has ended at 325. This may happen, for example, if the target is lost or if the target has passed the host vehicle and/or a threshold distance from the host vehicle.

If the target track has not been terminated, process 300 may proceed to step 330 at which point the track/lane error statistics may be updated. In some implementations, step 330 may comprise using data associated one or more measurements associated with a tracked target, such as a moving target vehicle. For example, in some embodiments and implementations, measurements for a specific target under track may be used to compute error biases and variances for each possible lane (for example, for the current lane, an adjacent lane, and a far adjacent lane). In some such embodiments and implementations, this may be accomplished using a lookup table, such as the lookup table referenced above.

The measured range, which may have been previously computed, may then be used to estimate the previous path angle estimates for each lane hypothesis (i.e., each possible lane of the target). Preferably, data for each possible lane hypothesis is maintained until the target gets close enough to more accurately or definitively determine the target lane.

Error statistics, such as error bias and variance statistics, for each possible lane hypothesis may then be computed for each angle estimate. Preferably, uncorrected measurement angles are used here to avoid a feedback loop that may corrupt the error bias and variance calculation. When the target passes the host vehicle and/or a threshold distance from the host vehicle, the confirmed lane may then be determined and the corresponding lane statistics for the confirmed lane may be used to update the final error correction table, as mentioned below.

After the track/lane error statistics for each possible lane have been generated, process 300 may proceed to step 335, at which point a determination may be made as to whether the target is within a threshold distance or range of the host vehicle. As previously mentioned, in some such implementations, the threshold distance may be an upper threshold distance of about 20 meters. In some such implementations, the upper threshold distance may be exactly 20 meters. In some implementations, the threshold distance may comprise a range of distances or, in other words, both an upper threshold and a lower threshold distance. In some such implementations, the lower threshold may comprise a distance of about 10 meters. In some such implementations, the lower threshold distance may be exactly 10 meters. In alternative implementations, the lower and upper thresholds may be about 5 meters and about 30 meters, respectively. Either of these alternative thresholds may be combined with the previous thresholds. For example, some embodiments and implementations may be configured to apply an upper threshold distance of 30 meters and a lower distance threshold of 10 meters, and so on.

If the target is not within the threshold or range, process 300 may return to an earlier step, such as step 300, to continue the generation of error statistics. If the target is detected within the threshold distance or range, process 300 may proceed to step 340 for preliminary lane assignment. Preferably the threshold distance/range of step 335 is selected such that angle errors in this region are small enough that angle bias error will not significantly change the lane computation. Thus, preferably a plurality of "looks" or detections are made within this threshold with the goal being to accumulate the lane estimates. Thus, the total number of looks/detections and the number of looks/detections for each lane may be recorded.

After step 340, the validity of the lane assignment estimations/assignments may be determined at step 345. In some embodiments and implementations, step 345 may take place after the target track has ended and/or the target has passed another threshold. In some such embodiments and implementations, step 345 may be triggered after the target has passed the lower distance threshold within the distance range used in connection with step 335. Alternatively, another distance threshold may be used that may be smaller than this lower distance threshold. In some embodiments and implementations, step 345 may be triggered when the target has reached and/or passed the host vehicle.

Once step 345 is triggered, this step may comprise making a final tally of all preliminary lane assignments from step 340. In some embodiments and implementations, step 345 may comprise applying one or more thresholds, which may be used to determine whether error statistics associated with a given target are used in connection with future target tracking or discarded. For example, in some embodiments and implementations, a minimum number of total detections/looks within the threshold distance/range of step 335 may be required. In addition, or as an alternative, a fractional number for each lane may be computed and a minimum percentage of detections/looks may be required in order to keep the error data. For example, in some embodiments and implementations, the lane with the most assignments must be greater than 60% of the total lane assignments. In some such embodiments and implementations, this percentage may be 75%. The goal of this threshold may be to remove data in connection with situations where a target vehicle has approached from behind and passed the host vehicle. The majority of these situations may be filtered out by requiring a threshold number of assignments in the initial threshold distance/range.

If this threshold or thresholds are not met, the error statistics generated at 330 may be discarded. If this threshold or thresholds are met, the error statistics associated with the tracked target may be updated at 350 and/or used in connection with future target tracking. For example, in some embodiments and implementations, step 350 may comprise updating angle-dependent angle error biases and/or variances for future track processing.

In some embodiments and implementations, error statistics and/or corrections may be saved and/or retrieved at 360. In some such embodiments and implementations, such corrections/statistics may comprise data compressed corrections/statistics. For example, some embodiments may be configured to transfer data from volatile to non-volatile memory at 360, which in some cases may coincide with turning a vehicle on or off or any other suitable trigger. Of course, in some embodiments and implementations, process 300 may proceed directly from step 350 to step 315 or another suitable step in the process. Similarly, in some embodiments and implementations, step 350 may comprise storing corrections, compressed or otherwise, immediately in any suitable format, volatile or non-volatile, in which case step 360 may be omitted. In addition, although not explicitly depicted in FIG. 3, it is contemplated that process 300 may revert to step 315, or any other suitable step, from step 360, as desired.

In some embodiments and implementations, stationary target data 355 may also be used to update the error statistics in step 350, as previously mentioned. For example, stationary target error corrections may be derived using the relationship between scatterer Doppler and angle. For example, in some embodiments and implementations, an initial determination may be made as to whether a particular target is indeed stationary, such as by making a determination as to whether a Doppler-derived angle referenced above is within a threshold angle of a direct bearing measurement and/or estimate. In some implementations, the threshold may be between about three degrees and about eight degrees. In some such implementations, this determination may be made if these two angles are within about five degrees of each other. In alternative implementations, a stationary detection cancellation scheme may be employed, such as a scheme that uses an estimate of a phase correction that will cancel any stationary target. Upon confirmation of a target being stationary, the relationship between the target Doppler and the radial velocity ($V_r$) of the host velocity ($V_H$) may be used to generate stationary target error corrections, as previously mentioned.

Figure 4:
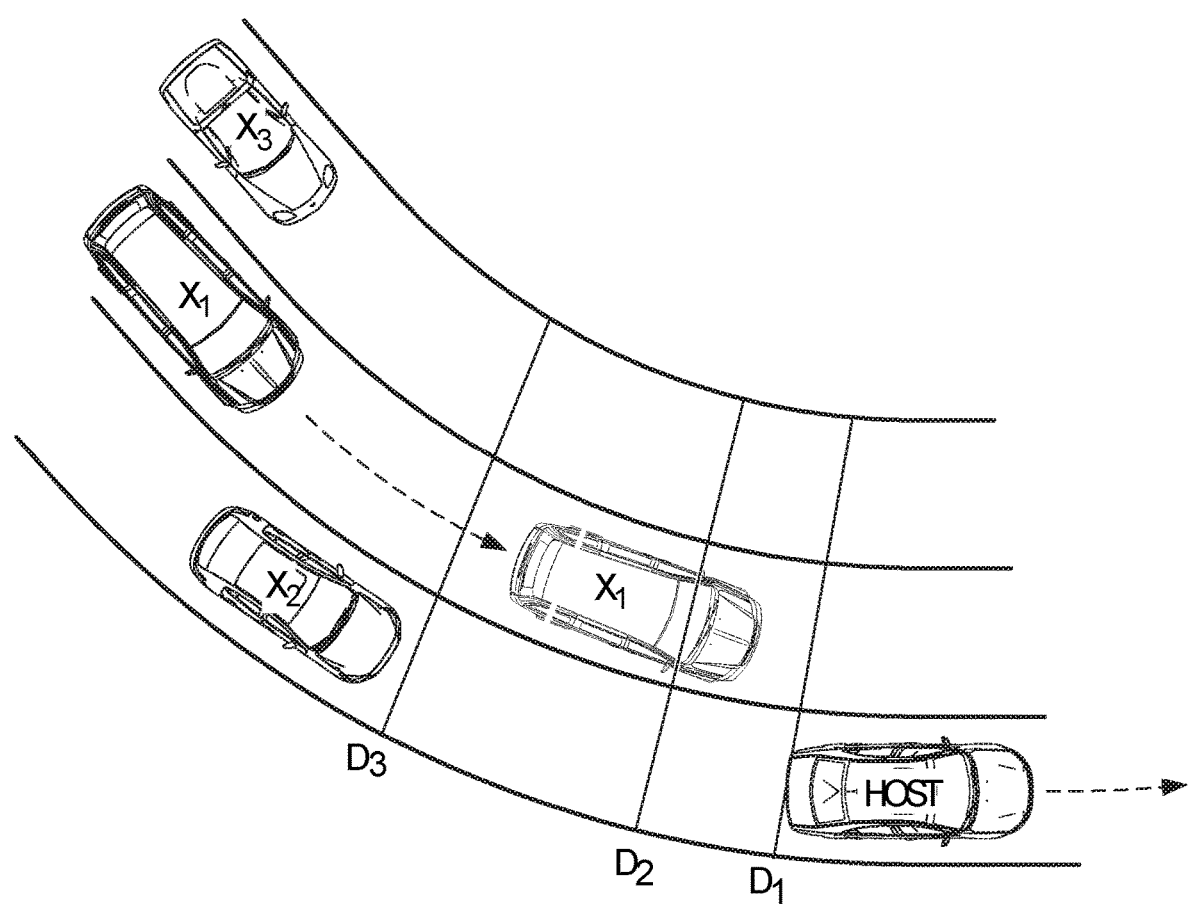
FIG. 4 illustrates a host vehicle and various target vehicles in two adjacent lanes to the target vehicle along with two distance thresholds from the host vehicle.

FIG. 4 illustrates a host vehicle and various target vehicles in two adjacent lanes to the target vehicle along with two distance thresholds from the host vehicle. More particularly, as discussed above, the host vehicle may comprise a sensor system, such as a RADAR sensor system, that may be configured to track targets $X_1$, $X_2$, and $X_3$, which may be positioned within a current lane, a first adjacent lane, and a far adjacent lane. It should be understood that this system may, in some embodiments, be further configured to provide for tracking in one or more adjacent lanes in the opposite direction—i.e., to the right of the host vehicle—if desired.

This system may be configured to, as previously mentioned, generate error correction data for each of a plurality of possible lanes for a given target while the target is beyond a threshold or range. For example, targets $X_1$, $X_2$, and/or $X_3$ may initially be tracked beyond distance threshold $D_3$, and error correction data, such as angle error biases and/or variances, may be calculated while the target(s) are beyond this threshold. Preferably, this data is maintained for each possible lane assignment within a plurality of lane assignments. Thus, in the depicted embodiment, error correction data for all three of the lanes shown may be maintained, at least initially.

Once a target has passed this threshold and the target is close enough to more accurately/definitively track its current lane (i.e., angle errors in this region are small enough that angle bias errors will not or are unlikely to change the lane assignment), a series of lane assignments may begin. Thus, in the depicted embodiment, when target $X_1$ is closer than distance threshold $D_3$ (in some embodiments, when target $X_1$ is within a range having lower and upper thresholds), this tally of lane assignments may be initiated. It should be understood that, although FIG. 4 is depicted with exaggerated vehicle sizes or distances not shown to scale, some embodiments may be configured to track a particular point of the vehicle, such as the front bumper or forward-most portion of the vehicle, and may track the position of this portion of the vehicle for purposes of one or more of the thresholds mentioned herein.

Some embodiments may be configured with one or more additional thresholds. Thus, once the host vehicle has either passed out of the distance range $D_2$-$D_3$, for example, the tally may be finalized and analyzed, as previously mentioned, to assess whether the track is sufficiently accurate to use the correction data for future tracks or discard the data. In alternative embodiments, this tally may be finalized after the target has either passed the host vehicle, after the target has passed another, smaller threshold distance ($D_1$, for example), or after the track has otherwise been terminated by the system.

As used herein, a software "module" or component may include any type of computer instruction or computer executable code located within a memory device and/or m-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Furthermore, embodiments and implementations of the inventions disclosed herein may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments and/or implementations may also be provided as a computer program product including a machine-readable storage medium having stored instructions thereon that may be used to program a computer (or other electronic device) to perform processes described herein. The machine-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions. Memory and/or datastores may also be provided, which may comprise, in some cases, non-transitory machine-readable storage media containing executable program instructions configured for execution by a processor, controller/control unit, or the like.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A method for correcting vehicle RADAR errors from within a moving host vehicle, the method comprising the steps of:
   generating a first data set representative of a historical map of a host vehicle trajectory;
   generating a second data set representative of one or more adjacent lanes to a current lane of the host vehicle;
   identifying a moving target vehicle using one or more environmental sensors of the moving host vehicle;
   generating a third data set comprising estimated RADAR correction values of an estimated bearing angle while the moving target vehicle is beyond a threshold distance from the host vehicle by comparing the estimated bearing angle of the moving target vehicle relative to the host vehicle with an observed bearing angle of the moving target vehicle relative to the host vehicle;
   generating a set of estimated lane assignments including at least the current lane of the host vehicle and at least one adjacent lane to the current lane of the host vehicle after the moving target vehicle has passed the threshold distance from the host vehicle;
   confirming a lane assignment of the moving target vehicle after the moving target vehicle has passed the threshold distance from the host vehicle; and
   applying at least a subset of the third data set as an input to a filter model associated with correcting RADAR errors associated with subsequent moving target vehicles.

2. The method of claim 1, wherein the threshold distance comprises a distance of no more than about 20 meters.

3. The method of claim 2, wherein the threshold distance comprises an upper threshold and a lower threshold.

4. The method of claim 3, wherein the lower threshold comprises a distance of about 10 meters.

5. The method of claim 1, wherein the second data set comprises data representative of a first adjacent lane to the current lane of the host vehicle and data representative of an adjacent lane to the first adjacent lane.

6. The method of claim 1, wherein the generating a set of estimated lane assignments comprises generating estimated lane assignments for the current lane of the host vehicle, a first adjacent lane to the current lane of the host vehicle, and an adjacent lane to the first adjacent lane after the moving target vehicle has passed the threshold distance from the host vehicle.

7. The method of claim 1, further comprising, before the step of applying at least a subset of the third data set as an input to a filter model associated with correcting RADAR errors associated with subsequent moving target vehicles, determining whether the set of estimated lane assignments for a most-assigned lane exceeds a threshold percentage of possible lane assignments.

8. The method of claim 7, further comprising, upon confirming that the set of estimated lane assignments has exceeded the threshold percentage, applying at least a subset of the third data set as an input to a filter model associated with correcting RADAR errors associated with subsequent moving target vehicles, wherein the third data set is not applied to the filter model associated with correcting RADAR errors associated with subsequent moving target vehicles if the set of estimated lane assignments has not exceeded the threshold percentage, and wherein the third data set is applied using only correction values associated with a confirmed lane assignment.

9. The method of claim 8, wherein the threshold percentage of lane assignments comprises between about 60% and 100%.

10. The method of claim 1, wherein the step of generating a third data set comprising estimated RADAR correction values while the moving target vehicle is beyond a threshold distance from the host vehicle further comprises compiling error statistics associated with one or more stationary targets.

11. A method for statistical correction of lane alignment of a moving target vehicle from within a moving host vehicle, the method comprising the steps of:
   generating a first data set representative of a historical map of a host vehicle trajectory;
   calculating a position of at least one adjacent lane to a current lane of the host vehicle using a predetermined lane width;
   identifying a moving target vehicle using one or more environmental sensors of the moving host vehicle;
   compiling error statistics associated with a bearing angle of the moving target vehicle under a hypothesis of the moving target vehicle being within the current lane of the host vehicle;
   compiling error statistics associated with a bearing angle of the moving target vehicle under a hypothesis of the moving target vehicle being within at least one adjacent lane to the current lane of the host vehicle;
   assigning the moving target vehicle to an assigned lane; and
   using error statistics associated with the assigned lane as an input to a filter model associated with statistical correction of lane alignment of subsequent moving target vehicles.

12. The method of claim 11, wherein the moving target vehicle is behind the host vehicle.

13. The method of claim 11, further comprising compiling error statistics associated with at least one stationary target.

14. The method of claim 13, wherein the step of compiling error statistics associated with at least one stationary target comprises comparing a bearing angle of a stationary target with an estimated bearing angle of the stationary target derived from Doppler RADAR data.

15. The method of claim 14, further comprising, prior to using error statistics associated with the assigned lane as an input to a filter model associated with estimating a lane assignment of subsequent moving target vehicles, confirming that a RADAR signal is being received from a stationary target.

16. The method of claim 15, wherein the step of confirming that a RADAR signal is being received from a stationary target comprises:

determining whether the bearing angle of the stationary target is within a threshold angle of the estimated bearing angle of the stationary target; and upon confirming that the bearing angle of the stationary target is within the threshold angle of the estimated bearing angle of the stationary target, considering the RADAR signal as having been received from a stationary target.

17. A system for statistical correction of lane alignment of a moving target vehicle from within a moving host vehicle, comprising:

one or more environmental sensors configured to generate vehicle environmental data associated with a moving host vehicle;

a vehicle trajectory module configured to process the vehicle environmental data and to generate vehicle trajectory data of the moving host vehicle;

a lane assignment module configured to generate a plurality of lanes using the vehicle trajectory data and a predetermined lane width, the plurality of lanes including a current lane of the moving host vehicle and at least one adjacent lane to the moving host vehicle;

an error estimation module configured to estimate angle bearing errors associated with bearing angles of targets; and a filter module configured to receive error data from the error estimation module and use the error data to improve future estimates of angle bearing errors associated with bearing angles of future targets.

18. The system of claim 17, wherein the one or more environmental sensors comprises a RADAR module.

19. The system of claim 17, wherein the targets comprise moving target vehicles.

20. The system of claim 19, wherein the targets further comprise stationary targets.

* * * * *